United States Patent [19]
Barnes

[11] 3,917,178
[45] Nov. 4, 1975

[54] MEAT CUTTER SLICER AND EXTRUDER
[76] Inventor: James H. Barnes, 283 Tolbert St., Wadsworth, Ohio 44281
[22] Filed: Sept. 12, 1973
[21] Appl. No.: 396,448

[52] U.S. Cl. ............................................. 241/82.5
[51] Int. Cl.² ........................................ B02C 18/36
[58] Field of Search ....... 241/82.1, 82.2, 82.4, 82.5, 241/82.7

[56] References Cited
UNITED STATES PATENTS

| 419,103 | 1/1890 | Baltzley | 241/82.5 |
| 693,750 | 2/1902 | Smith | 241/82.5 |
| 737,783 | 9/1903 | Schyia | 241/82.5 |
| 2,284,722 | 6/1942 | Burns | 241/82.4 |

FOREIGN PATENTS OR APPLICATIONS

| 654,469 | 9/1934 | Germany | 241/82.5 |

*Primary Examiner*—Roy Lake
*Assistant Examiner*—E. F. Desmond
*Attorney, Agent, or Firm*—Oldham & Oldham Co.

[57] ABSTRACT

A meat cutting or grinding device including a frame in which an extruding means is provided for moving meat along the axis of the extruder and a cutter means is present for cutting it into sections. The device includes a discharge plate or disc perpendicular to the axis of the extruding means and which discharge disc has a plurality of axially extending apertures or slots therein in association with support sections to provide slices or flakes of meat as forced through the discharge means by the extruder member.

2 Claims, 11 Drawing Figures

U.S. Patent  Nov. 4, 1975  3,917,178
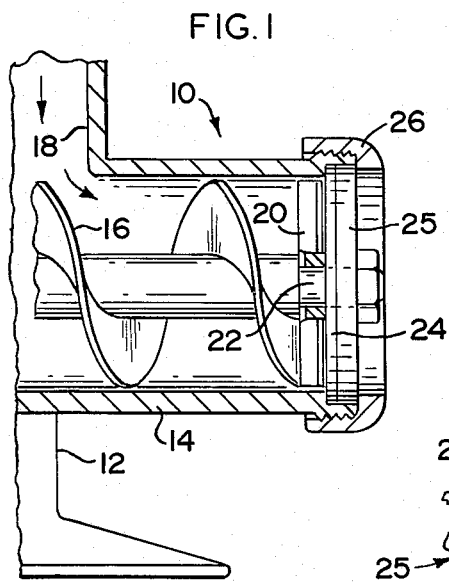
FIG. 1
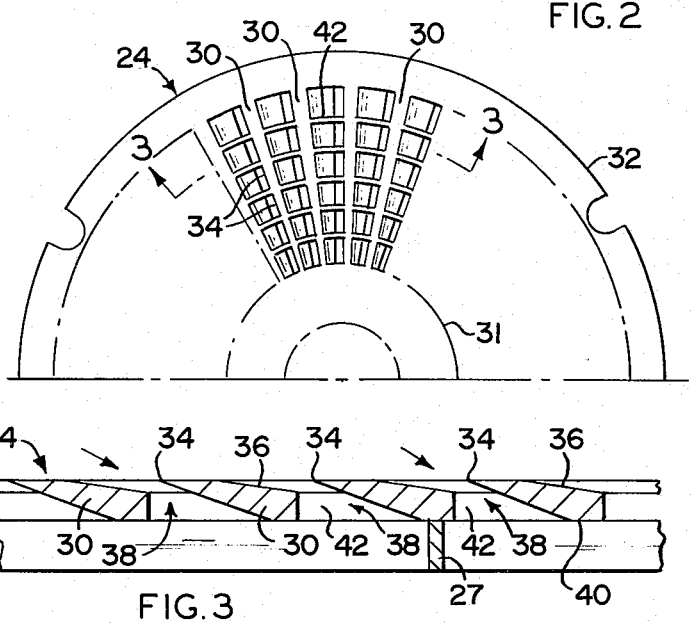
FIG. 2
FIG. 3
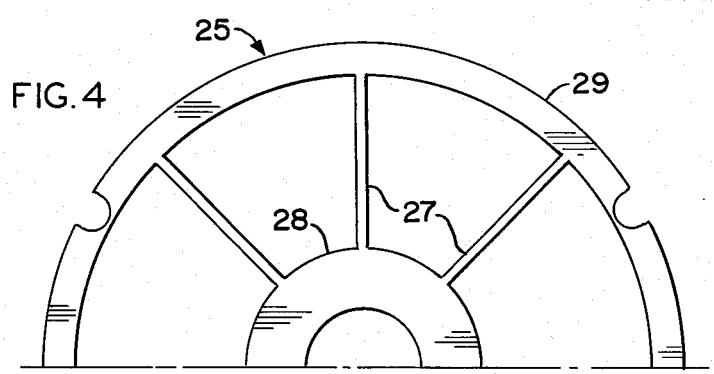
FIG. 4
FIG. 5
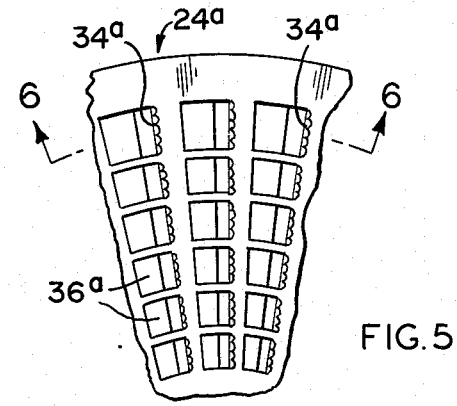
FIG. 6
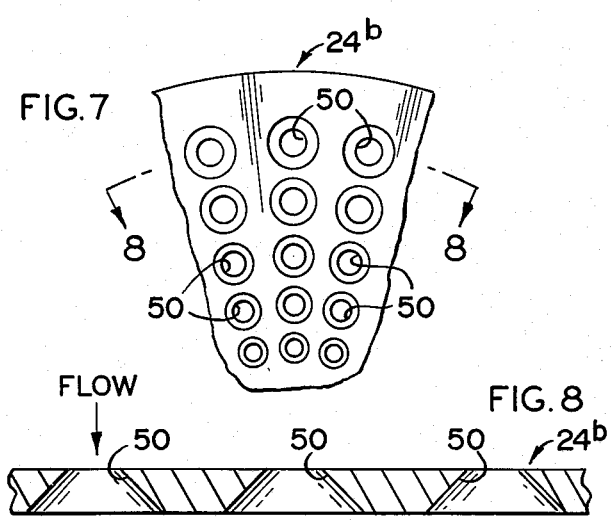
FIG. 7
FIG. 8
FIG. 9
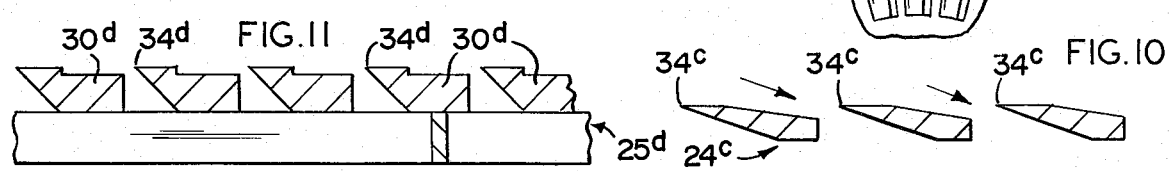
FIG. 11
FIG. 10

MEAT CUTTER SLICER AND EXTRUDER

This invention relates to meat cutting and/or grinding devices, and especially to such a member having a special discharge means or disc therein with specially contoured cutting edges and support sections for providing a slicing effect on the meat being processed.

Reference is made to my co-pending application Ser. No. 206,644 on a meat cutting or extruding device.

It is the general object of the present invention to provide a novel and improved meat cutting or slicing device wherein the cut meat particles produced are thin slices or flakes.

A further object of the invention is to provide an improved, different type of a grinder wherein the meat is compressed, or supported and cut in unusual manners as it is processed to provide unusual and desirable softness and flavor characteristics in the ground meat.

Another object of the invention is to provide a relatively inexpensive but sturdy and improved type of a meat grinder having a special discharge, support or extrusion plate therein in which the meat is specially processed by being compressed, sliced, and/or shredded in the grinding device which otherwise can be of a conventional nature.

The foregoing and other objects and advantages of the invention will be made more apparent as the specification proceeds.

Reference now is made to the accompanying drawings, wherein:

FIG. 1 is a fragmentary vertical section through a meat grinder or extrusion member embodying the principles of the invention;

FIG. 2 is an enlarged front elevation of an extrusion disc shown in FIG. 1;

FIG. 3 is a fragmentary enlarged cross section taken on line 3—3 of FIG. 2;

FIG. 4 is a fragmentary elevation of a backup plate used in the apparatus of the invention;

FIG. 5 is a fragmentary elevation of a sector of another extrusion plate or disc of the invention;

FIG. 6 is a fragmentary enlarged sectional view taken on line 6—6 of FIG. 5;

FIG. 7 is a fragmentary elevation of another sector of a further modified extrusion plate of the invention;

FIG. 8 is a fragmentary enlarged elevation taken on line 8—8 of FIG. 7;

FIG. 9 is a fragmentary elevation of a sector of another modified extrusion plate of the invention;

FIG. 10 is a fragmentary enlarged elevation or section taken on line 10—10 of FIG. 9; and FIG. 11 is a fragmentary section through a further modified extrusion disc of the invention with a backup plate being associated therewith.

When referring to corresponding members shown in the specification and referred to in the drawings, corresponding numerals are used to facilitate comparison therebetween.

With reference to the details of the structure shown in the drawings, a meat cutting or grinding device is indicated as a whole by the numeral 10. The device is of substantially conventional construction insofar as it includes a frame 12 having any desired type of a support provided therefor and which frame 12 defines a cylindrical extrusion chamber 14. A rotatable extrusion or forcing means in the form of a screw 16 is provided and it is journalled in the chamber 14 on the longitudinal axis thereof to substantially fill the same. This screw is provided with a manual or other type of a driven power handle or other member connected thereto for rotating this screw and moving any meat chunks or portions received in the chamber 14 axially thereof. This meat can be fed into the chamber 14 through a hopper 18 operatively connecting thereto. At the discharge end of the chamber 14, a cutter member 20 usually of conventional design is suitably operably secured to a shaft 22 of this screw 16 for rotation with the screw and shaft. Also, a discharge means, or cutter disc or plate 24 is firmly positioned at the discharge end of the chamber 14. A reinforcing disc 25 abuts on the disc 24 on its downstream side. These discs 24 and 25 are secured against the end of the frame 12 as by a removable cap 26 engaging the frame 12 and retaining them in position. The end of the screw 16 normally is journalled in apertures in the discs 24 and 25.

This reenforcing disc 25 can be of any desired thickness and it normally is made from metal. It has a plurality of circumferentially spaced radially extending reenforcing ribs 27 extending between a hub portion 28 thereof to an annular outer ring 29. Obviously, the discs 24 and 25 are of suitable diameter for engaging the discharge end of the frame 14.

Specifically, the cutter disc or discharge means 24 has a plurality of circumferentially spaced, radially extending ribs 30 extending between an annular hub 31 thereof and a peripheral ring 32 formed on such disc.

These spokes 30 are relatively closely spaced circumferentially of the disc, and the leading edges of the spokes, as indicated at 34, are quite sharp for cutting action on meat forced thereagainst by action of the screw 16. The cutting edges in the disc lie in and/or define a cutting plane, and the trailing portions of the spokes 30 are inclined away from this cutting plane at a small acute angle. This forms surfaces 36 on the spokes that are at the trailing portions thereof in relation to relative rotary action of the cutter means 20 and its movement of meat or other materials toward the sharp cutting edges 34 of the spokes in this cutting disc. By spacing the spokes closely adjacent from each other and by the inclination of the surfaces 36 at a small angle, such as about 5° to about 10°, a quantity of the material being processed moves through the cutting plane inbetween the cutting edges of the adjacent spokes 30. Hence, this provides the material to be cut from the mass of material being processed by the rotary action of the cutting blade 20 and which material then is forced out through the adjacent openings 38 between the spokes. As the spacing of the spokes 27 is much greater than the spacing of the spokes 30, meat or other material moving between the spokes 30 will pass between the adjacent spokes 27 and be discharged from the device of the invention.

Preferably the downstream faces of the spokes 30 are flat as indicated at 40 for abutting against flat faces provided on the adjacent surface of the reenforcing disc 25.

These spokes 30, as shown in FIGS. 2 and 3, preferably have radially spaced reenforcing bars 42 extending therebetween, as indicated in the drawings, and a plurality of these reenforcing bars may be provided at radially spaced portions of the disc to reenforce the same, as desired.

A modified cutter disc 24a is shown in FIG. 5 and this disc is very similar to the disc 24 except that in this instance, special cutting edges 34a are provided on the spokes 30a of the cutter disc. These edges 34a are recessed or cupped along the radial length of the spoke and are noticeably blunter than a sharp cutting edge. The adjacent spokes are spaced from each other and the trailing face of the spokes 30, as indicated at 36a, is recessed in relation to the leading edge of the spokes.

FIGS. 7 and 8 of the drawings show yet a further modified plate 24b of the invention and in this instance, the spokes provided in the cutting disc have a plurality of conically shaped apertures 50 formed therein with sharp cutting edges being provided on the cutting face of this disc for cutting action in association with the cutter member 20. Flow of the extruded and/or cut material is from the smaller diameter portion to the larger diameter portion to ease passage of such material through the apparatus.

A cutter disc 24c is shown in FIGS. 9 and 10 and in this instance, the cutting spokes have sharp cutting edges 34c formed thereon and the slots or spokes extend the radial length of the disc but with no reenforcing members like the members 42 being provided thereon.

Yet another type of a cutting spoke 30d is shown in FIG. 11 wherein a sharp cutting edge 34d is provided on the blades and the trailing surface of these spokes 30d is recessed in a manner similar to that shown in FIG. 6 of the drawings. A reenforcing disc 25d is abutted against the flat trailing face surfaces of this disc 30d.

By the present invention, an improved type of a cutting disc has been provided, and meat will be forced against the cutting edges of the cutter or discharge discs 24 and the like provided by the invention. The cutting action by the cutter 20 and associated means will provide flaking or slicing action on the materials being processed. Thus, an improved type of a cutting action has been obtained.

While several complete embodiments of the invention have been disclosed herein, it will be appreciated that modification of these particular embodiments of the invention may be resorted to without departing from the scope of the invention.

What is claimed is:

1. In a meat cutting and/or grinding device, a frame forming an enclosure in which an extruding or forcing means is provided for moving meat along the axis of such means, the combination therewith of a discharge means carried by said frame at an end of the enclosure and positioned normal to said axis, said discharge means having a plurality of spaced radially extending spokes therein with sharp cutting edges on the leading portions thereof, which cutting edges define a cutting plane and with trailing face portions of said spokes being recessed from said cutting plane, radially spaced reenforcing bars extending between said spokes, and a rotatable cutter means immediately adjacent said discharge means for aiding in cutting the meat into small pieces in cooperation with said cutting edges; said spokes having flat surfaces lying in said cutting plane at the leading edges of the spokes and the trailing portions of said spokes are spaced from but parallel to the cutting plane.

2. In a meat cutting device as in claim 1 where the trailing portions of said spokes are inclined away from the cutting plane at a small acute angle, and said reenforcing bars are recessed from said cutting plane and form an annular unit with portions of said spokes.

* * * * *